(12) United States Patent
Beaudoin

(10) Patent No.: US 11,455,572 B2
(45) Date of Patent: Sep. 27, 2022

(54) MACHINE LEARNING MODEL HARDWARE CONFIGURATION BASED OPTIMIZATION

(71) Applicant: Element AI Inc., Montreal (CA)

(72) Inventor: Philippe Beaudoin, Montreal (CA)

(73) Assignee: SERVICENOW (CANADA) INC., Montreal (CA)

( * ) Notice: Subject to any disclaimer, the term of this patent is extended or adjusted under 35 U.S.C. 154(b) by 613 days.

(21) Appl. No.: 16/549,191

(22) Filed: Aug. 23, 2019

(65) Prior Publication Data

US 2020/0065708 A1 Feb. 27, 2020

Related U.S. Application Data

(60) Provisional application No. 62/722,391, filed on Aug. 24, 2018.

(51) Int. Cl.
| | |
|---|---|
| *G06N 20/00* | (2019.01) |
| *G06N 3/08* | (2006.01) |
| *G06F 17/16* | (2006.01) |
| *G06F 9/50* | (2006.01) |
| *G06F 11/34* | (2006.01) |

(52) U.S. Cl.
CPC ........... *G06N 20/00* (2019.01); *G06F 9/5044* (2013.01); *G06F 11/3495* (2013.01); *G06F 17/16* (2013.01); *G06N 3/082* (2013.01)

(58) Field of Classification Search
CPC ........ G06N 20/00; G06N 3/082; G06F 17/16; G06F 9/5044; G06F 11/3495
See application file for complete search history.

(56) References Cited

U.S. PATENT DOCUMENTS

| | | | |
|---|---|---|---|
| 2016/0217390 A1* | 7/2016 | Shoaib | G06N 20/10 |
| 2017/0011077 A1* | 1/2017 | Kypreos | G06Q 40/00 |
| 2017/0300830 A1* | 10/2017 | Kadav | G06F 15/17312 |
| 2018/0089587 A1* | 3/2018 | Suresh | G06N 7/005 |
| 2018/0188938 A1* | 7/2018 | Deselaers | G06N 20/00 |
| 2018/0225585 A1* | 8/2018 | Dong | G06N 7/08 |
| 2019/0025813 A1* | 1/2019 | Celia | G01M 13/045 |
| 2020/0065342 A1* | 2/2020 | Panuganty | G06F 16/632 |
| 2020/0097810 A1* | 3/2020 | Hetherington | G06N 3/0454 |

* cited by examiner

*Primary Examiner* — Tuan C Dao

(74) *Attorney, Agent, or Firm* — Matthew Roy; Gowling WLG (Canada) LLP

(57) ABSTRACT

Systems and methods relating to machine learning. A machine learning model is trained on a data processing system with the most amount of resources available to it. The resulting trained model is the basis for various stripped down versions that are suitable for execution on systems with less resources available. Specific system/version combinations are tested to determine which combination works best with specific systems and versions. To update installed trained models, a differential compression method can be used so that only an update difference needs to be uploaded to the system being updated.

18 Claims, 3 Drawing Sheets

MACHINE LEARNING MODEL HARDWARE CONFIGURATION BASED OPTIMIZATION

RELATED APPLICATIONS

This application is a non-provisional patent application which claims the benefit of U.S. Provisional Application No. 62/722,391 filed on Aug. 24, 2018.

TECHNICAL FIELD

The present invention relates to machine learning. More specifically, the present invention relates to systems and methods for determining suitable computer system configurations for implementing specific machine learning models.

BACKGROUND

The rise of machine learning and the increasing ubiquity of computers in today's world have both proceeded at a breakneck speed in the past few years. Nowadays, computer systems or, more properly, data processing systems can take many forms and configurations. Such data processing systems can take the form of large, cloud-based computing platforms with almost unlimited amounts of data storage, copious amounts of processing power, and more than ample amounts of temporary storage (i.e. random access memory or RAM). These platforms can allocate storage, RAM, and processing power as needed by multiple processes. At the same time, data processing systems can also take the form of system-on-a-chip (SoC) platforms with one or more processing cores, a limited amount of RAM, and some data storage. Of course, other data processing platforms can run the gamut between these extremes—from the data processing system on smartphones to desktops with dedicated GPUs for machine learning to business and consumer notebooks to dedicated computer servers with multiple parallel processors and their attendant storage and RAM banks.

One issue with machine learning in the current environment of such a myriad of system configurations is that of determining an optimal configuration for a machine learning model. While a model may benefit from having as much processing power and as much RAM available, using a model trained with such resources may not be the most optimal should the model need to be implemented on a data processing system that does not have such unlimited processing power or large amounts of RAM. As an example, a model trained using a large amount of processing power and a large amount of other resources (using system A) may deliver results with excellent precision very quickly. However, the trained model, when implemented on system B with much less resources than system A, may only provide barely acceptable results with minimal precision after an inordinate amount of time. Conversely, the trained model, when implemented on a system C that has less resources than system A but more resources than system B, may provide acceptable results having usable precision in acceptable time. For this example, system C would probably be the practical choice for implementing the machine learning model as it delivers acceptable results in acceptable time without consuming or requiring as much resources as system A. System A would be the implementation choice for the most precise results but, for acceptable results, system C would be the practical choice.

Another issue with machine learning is that of latency, especially when it comes to the different system configurations. As is well-known, data processing systems with less resources tend to be physically closer to the so-called "decision point" or point of delivery where the result of the machine learning is used or applied. As an example, a user needing to have real-time human speech in one language translated into a second language would probably have available the data processing capabilities of a smartphone. For this example, the point of delivery is the user's location. While the smartphone's capabilities may not be suitable for implementing a human speech translation model, if necessary, the smartphone would be able to upload the speed data to a cloud server to perform the necessary translation using a trained machine learning model. Unfortunately, because of the physical (and logical) distance between the point of delivery and the cloud server, there may be delays of up to a few seconds for the data to be uploaded, processed, and downloaded to and from the cloud server. It would, of course, be preferable if the smartphone can perform most of the translation model's processing so that a more real-time experience can be delivered to the user. This might remove or at least lessen the latency or the time for data to be received, processed, and results returned to the user.

In addition to the two issues above, a combined issue may be the trade-offs between latency and precision. As is well-known in the field, implementing a model on a a cloud server with copious amounts of processing power and associated resources can provide very precise results. However, this comes at the expense of latency as, generally, the amount of time needed to send the input data, process that data, and receive back the results tends to increase as the amount of resources increases. Latency can thus be seen as being directly proportional (in a general sense) to the amount of resources available to a machine learning model. As shown from the example above, the least amount of latency would be provided by the smartphone implementation of the model, with the smartphone having the least amount of resources available. Similarly, a cloud computing implementation would have the most resources available to a model but would also involve the most amount of latency for the user.

From the above, there is therefore a need for systems and methods which assist in determining practical data processing configurations for implementations of machine learning models. As well, there is also a need for systems and methods which assist in reducing the latency when delivering machine learning results to a point of delivery.

SUMMARY

The present invention provides systems and methods relating to machine learning. A machine learning model is trained on a data processing system with the most amount of resources available to it. The resulting trained model is the basis for various stripped down versions that are suitable for execution on systems with less resources available. Specific system/version combinations are tested to determine which combination works best with specific systems and versions. To update installed trained models, a differential compression method can be used so that only an update difference needs to be uploaded to the system being updated.

In a first aspect, the present invention provides a method for determining which hardware platform to use when implementing a machine learning model, the method comprising:

a) determining configurations of multiple hardware platforms, each of said multiple hardware platforms having different hardware configurations from each other;

b) selecting a specific selected hardware platform from said multiple hardware platforms;

c) training a specific machine learning model on said selected hardware platform to result in a first trained model;

d) adjusting said first trained model to operate on another of said multiple hardware platforms to result in at least one second trained model;

e) determine performance data of said at least one second trained model to determine efficacy and latency data for said at least one second trained model;

f) repeating steps d) and e) for each of said multiple hardware platforms to result in multiple second trained models and in a trade-off data set comprising efficacy and latency data for each of said multiple hardware platforms;

g) determining an optimal hardware platform to use when operating said machine learning model based on said trade-off data.

In a second aspect, the present invention provides a method for determining updates for multiple versions of a machine learning model on different hardware platforms, the method comprising:

a) determining configuration of multiple hardware platforms, each of said multiple hardware platforms having different hardware configurations from each other;

b) selecting a specific selected hardware platform from said multiple hardware platforms;

c) training a specific machine learning model on said selected hardware platform to result in a first trained model;

d) adjusting said first trained model to operate on another of said multiple hardware platforms to result in at least one second trained model;

e) repeating step d) for each of said multiple hardware platforms to result in multiple second trained models;

f) training an improved version of said specific machine learning model on said selected hardware platform to result in an improved first trained model, said first trained model and said improved first trained model having parameters that are as similar as possible to each other;

g) adjusting said improved first trained model to operate on another of said multiple hardware platforms to result in at least one improved second trained model, said improved second trained model having parameters that are as similar as possible to said at least one second trained model;

h) repeating step g) for each of said multiple hardware platforms to result in multiple improved second trained models;

i) for each of said multiple hardware platforms, determining an update difference;

j) uploading a specific update difference for each of said multiple hardware platforms;

wherein said update difference is a difference between said second trained model for a specific hardware platform and said improved second trained model for said specific hardware platform;

steps f) to j) are executed only after one second trained model is installed on at least one of said data processing systems.

BRIEF DESCRIPTION OF THE DRAWINGS

The embodiments of the present invention will now be described by reference to the following figures, in which identical reference numerals in different figures indicate identical elements and in which.

DETAILED DESCRIPTION

Figure 1:
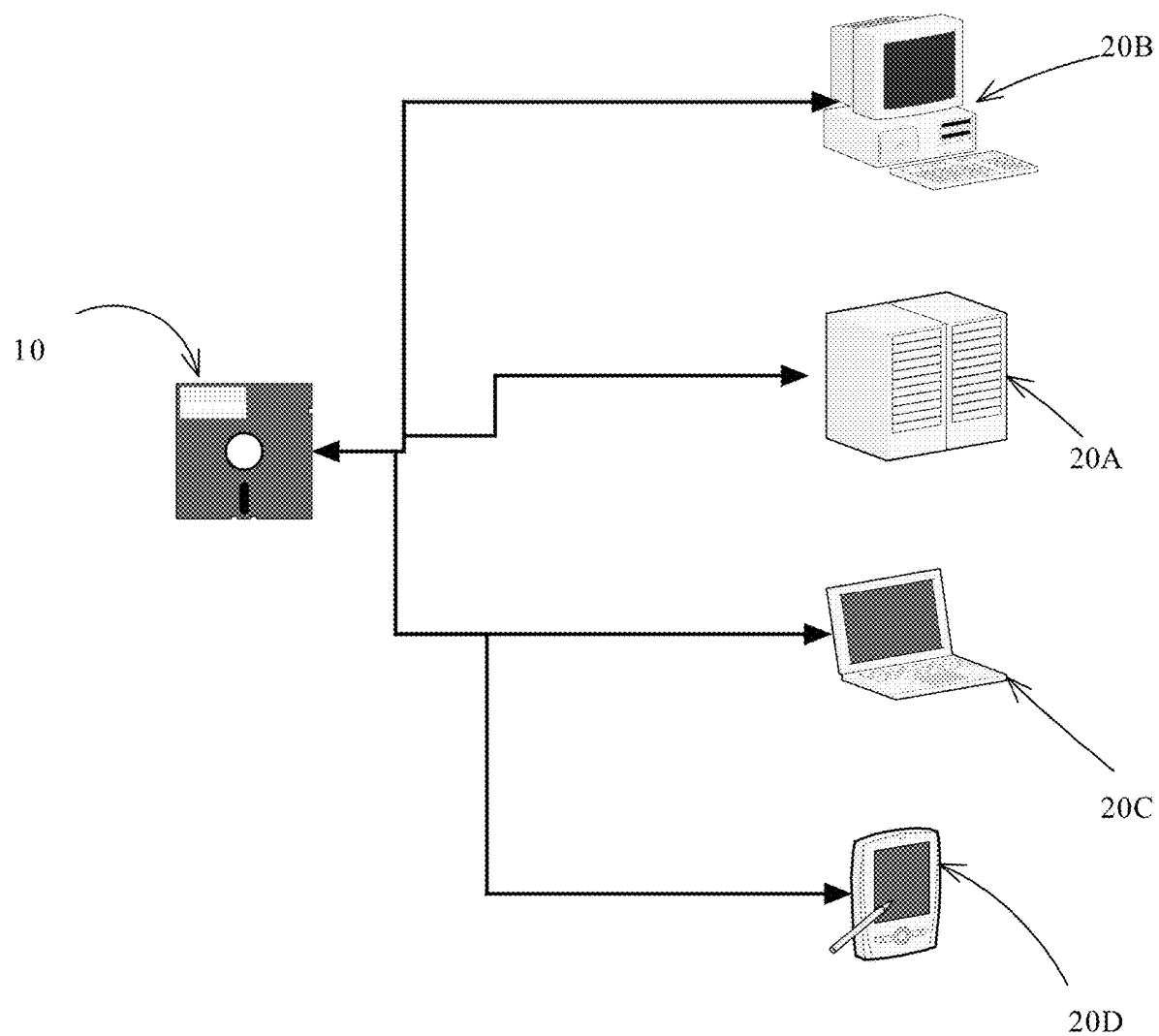
FIG. 1 is a schematic diagram of an environment on which the present invention may be practiced.

Referring to FIG. 1, a schematic diagram of one aspect of the invention is illustrated. As can be seen, a software module 10 is schematically illustrated as being in communication with multiple data processing systems 20A, 20B, 20C, 20D. in one example, data processing system 20A is a cloud server accessible to said software module 10 by way of a network connection. Data processing system 20B is a desktop, again accessible through a direct network connection between the system 20B and the software module 10. Data processing system 20C is a consumer grade laptop that communicates with the software module through a wireless network connection while data processing system 20D is a handheld data communications device (e.g. a smartphone) with data processing capabilities that directly communicates with the software module 10. The software module 10 may reside on the data processing system 20D and may be resident on a separate host data processing system that communicates with the different data processing systems by way of network connections.

In the present invention, the software module queries the various data processing systems 20A, 20B, 20C, 20D about the systems' capabilities and resources. This may be done by having the software module 10 execute specific commands and system calls that result in an indication of each system's RAM size, number of processor cores, available storage, operating system details, processor core speeds, and, if necessary, benchmark numbers. (It should be clear that the benchmark numbers may be benchmark numbers that either indicate each system's capabilities overall or indicate each system's processor speed/number of cores)

In terms of machine learning, a machine learning model (which may or may not involve software modules that include neural networks) may be trained using an ideal (or as close to ideal) data processing system with a large amount of available resources. Such a data processing system may be a dedicated system with multiple GPUs, multiple CPU cores with high clock speeds, a large amount of available data storage, and a large amount of available RAM. Once trained, the trained model can then be used to determine its performance on the various configurations of the different data processing systems referred to and illustrated in FIG. 1.

To accomplish this, a version of the trained model can be installed on the various data processing systems 20A, 20B, 20C, 20D. The software module 10 (or a similar software module that is in communication with the various data processing systems) can then benchmark the performance of the trained model on each of the data processing systems.

It should be clear that the version of the trained model installed on the various data processing systems may not be an exact copy of the trained model that resulted from the training on the ideal data processing system. Depending on the implementation, the version installed on the various data processing systems may be stripped down versions of the trained model. As an example, the stripped down version of a fully trained neural network may have fewer hidden layers than the full version. Or, as an alternative, the weight matrices used in the stripped down version may have fewer entries or have entries that are lower in value than the full version of the neural network. This would be done to ensure that the model is capable of being run by the various data processing systems, each of which would have differing hardware capabilities from each other.

It should be clear that if layers are to be removed from the model, the model would need to be re-optimized once the layers have been removed to ensure that the model still functions properly. As well, if the values in the weight matrices are to be adjusted, this may be done to sacrifice precision to ensure that the model runs faster or runs more efficiently on less capable platforms (i.e. platforms that have less resources). To this end, the values in the weight matrices may be adjusted to have less precision. As an example, if values in the weight matrices for the trained model are double or triple precision values (i.e. that values are numbers that have two or three decimal places), these values may be rounded up or adjusted so that the values only have a single decimal place or so that the values are whole integer numbers. This may produce less precise results from the model but may allow the model to function on less capable platforms. Of course, once values in the matrices have been adjusted, the model is re-optimized to ensure that the model works properly.

It should also be clear that the process of removing layers and/or adjusting the values in the weight matrices may be done manually (i.e. by humans) or automatically (i.e. by software). Regardless of how the layers or the values are adjusted, the stripped down model must be re-optimized to ensure that the adjusted model is functioning properly. It should be clear that, for some cases, a full retraining may be required after layers have been removed or after weight matrix values have been adjusted. However, in most cases, merely re-optimizing the model should provide a stripped down model that operates in a manner similar to the fully trained model. Re-optimizing the stripped down model may simply mean readjusting the model to ensure that the output is similar to or within acceptable limits of the output of the originally fully trained model. As well, re-optimizing the stripped down model may mean readjusting the neural network implementing the stripped down model so that the neural network more closely resembles the larger neural network that implements the fully trained model.

Since different versions of the trained model would be needed to run on the different data processing systems, a different software module may be used to generate these various versions. As an example, such a software module would take, as input, the fully trained model and its various weight matrices and hidden layers. The software module can then remove one or more hidden layers to produce a version of the trained version of the model. This lesser or smaller version, after it is re-optimized, can then be tested to ensure that its output either matches with or is in line with the output of the full version of the trained model. As long as the output of the reduced version is within an acceptable (and predetermined) range of the output of the full version, this reduced version can be considered to be acceptable. An iterative process, with each iteration involving the removal or "stripping down" of the various hidden layers, can then be used with each iteration being tested (after re-optimization of the model) to ensure that the stripped down version of model still produces results that are useful, acceptable, and in-line with the results from the full model. As an alternative, instead of removing hidden layers, as noted above, reducing the values or the precision of the weights used in the matrices may also be tried. The values in the weight matrices can be reduced iteratively until the stripped down version no longer produces acceptable results. Using either method or a combination of the two, multiple versions of the trained model can be generated automatically.

As an alternative to the above, the trained model can also be manually adjusted/modified or stripped down to work on the different data processing systems with their different hardware configurations. Of course, such a manual process should aspire to keep the stripped down version of the model as close to the full version as possible. As noted above, stripping down the trained model may include steps such as removing hidden layers in neural networks and adjusting the values in weight matrices so that the calculations that need to be performed will be simpler and/or easier to execute. To this end, as an example, instead of using large whole numbers in the weight matrices, perhaps fixed smaller factors of the weights may be used. Thus, instead of using a weight matrix with entries of, say, 10, 15, 20, 30, the weights can be adjusted by applying a common divisor of, say, 5. After applying such a common divisor, the weight matrix would then have entries of 2, 3, 4, 6. Regardless of the method used in adjusting the trained model, multiple versions of the trained model is preferably generated.

As another alternative, instead of generating multiple versions of the trained model and then determining which version works with which data processing system configuration, the trained model can be adjusted/modified so that a specific version is crafted to work specifically on a specific data processing system. Thus, instead of generating stripped down version A, B, or C of the trained model and then determining which of these versions work best on, for example, a desktop computer data processing system, a specific version can be crafted such that the version is guaranteed to work on the desktop computer. This ensures that an optimal version of the trained model is available for each of the various data processing systems noted above.

Using the methods above for generating various versions of the trained model, once the various versions of the trained model have been produced, these versions can then be tested on the various hardware configurations of the different data processing systems. Each version can be run on each of the data processing systems and the results can be ranked/gathered. Ranking can be done on the basis of speed (i.e. how fast before an acceptable result is produced), accuracy (i.e. how close is the result to the result from the full version of the trained model), and latency (i.e. how long does it take to send input data to the data processing system and to receive acceptable results from the data processing system). Using the results, a decision can then be made as to which combination of data processing system and version of the fully trained provides the best results. Of course, different implementations may need to use different criteria. As such, for implementations where latency is at a premium, the system/version combination that provides the lowest latency may be selected. Similarly, in implementations where accuracy is most prized, the system/version combination that provides the best accuracy may be selected. Or, for a balanced approach, the system/version combination that provides the best combination of low latency, high accuracy, and speed may be selected.

It should be clear that each combination of system/version will produce a data set detailing the trade-offs being made. Such a data set would detail the latency as well as the efficacy of the system/version combination. Thus, as an example, a cloud server system may produce the most accurate results but may also result in the highest latency numbers. Similarly, a smartphone based system may produce low latency numbers but may also produce the worst accuracy results (perhaps since only the most stripped down version may work on such a system). As noted above, decisions on which system to use to implement which version of the trained model can be based on the trade-off data sets generated for each system/version combination.

From the above, it should also be clear that not all versions of the trained model will work on all the data processing systems. As an example, the full version may not even run on the smartphone-based data processing system. Or, even if a data processing system is capable of running or executing a specific stripped down version of the trained model, the model may take an inordinate amount of time to produce a useful or usable result. As such, some system/version combinations may simply be unworkable. Of course, if a specific system/version combination does not work or will not execute, then a trade-off data set will not be generated or will only contain an indication that the combination does not work.

In another aspect of the present invention, the concepts noted above can be used to ease the process of updating machine learning models installed on the various data processing systems noted above. In this aspect, a new version of the trained model is initially trained on, again, the most capable data processing system available. As noted above, this may be an ideal (or as close to ideal as possible) data processing system. The new version of the trained model (we can call it V2 of the trained model) can thus be the basis for stripped down or second trained models that are capable of operating on at least one of the other data processing systems. As with the explanation above, the data processing systems all have differing configurations and differing capabilities and resources available to them. One concept of this aspect of the invention is that the stripped down versions of V2 of the trained model can execute on lesser capable hardware configurations.

Once V2 of the trained model has been generated, preferably with V2 being as closed to the initial trained model as possible (i.e. with V2 having similar weight matrices and layers as possible), the various versions of V2 of the trained model can be generated. Again, these various versions can be generated using the methods and concepts explained above. These various versions can then be tested to see which stripped down versions of V2 of the trained model are most suited for which data processing systems. Preferably, the stripped down versions of V2 have parameters as close as possible to the stripped down versions of the first trained model. Once a suitable system/version combination has been determined for each of the data processing systems, updates to the installed model can be prepared and uploaded.

To prepare the updates, it must first be realized that each of the data processing systems already have a version of the trained model installed on it. Instead of having to upload a complete installation, a differential compression method may be used to shorten upload times. To this end, a difference between the new version to be installed and the installed version is calculated/determined. The resulting data (the update difference) is what is uploaded to the data processing system to be updated. The data processing system can then determine the new version using the uploaded data and the installed version. Of course, all of this presupposes that the installed version is known and that the stripped down version to be used in updating the data processing system is sufficiently similar to this installed version.

Figure 2:
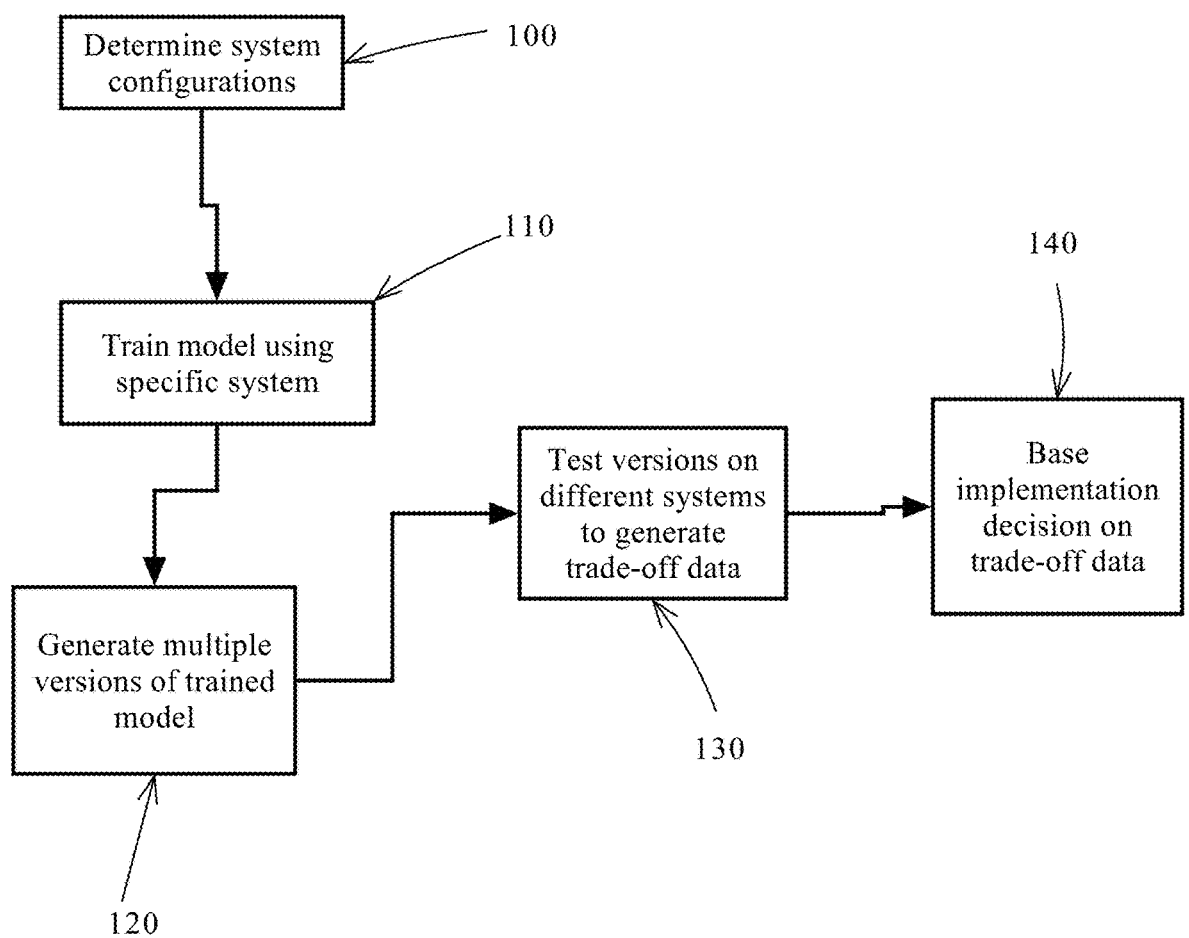
FIG. 2 is a flowchart detailing the steps in a method according to one aspect of the present invention.

Referring to FIG. 2, a flowchart detailing the steps in one aspect of the invention is illustrated. In step 100, the different configuration of multiple hardware platforms (i.e. the data processing systems) are determined. This can be done automatically by executing one or more modules that query the different systems, with the output being the configuration of each system. In step 110, a specific machine learning model is then trained on a data processing system that has the most resources available to it. Preferably, this system is ideal or is as close to ideal as possible given the various data processing system options available. Once the resulting trained model is available, multiple versions of this trained model are then generated (step 120). As noted above, these versions are stripped down versions with options or resources within the model being adjusted as necessary so that the versions run on one or more of the various data processing systems queried in step 100.

After the various versions of the trained model have been generated, these versions are then tested on each of the data processing systems (step 130). This is done to gather performance data for each system/version combination. The resulting trade-off data set can then be used to decide as to which version is most suited for use/implementation on which system (step 140).

Figure 3:
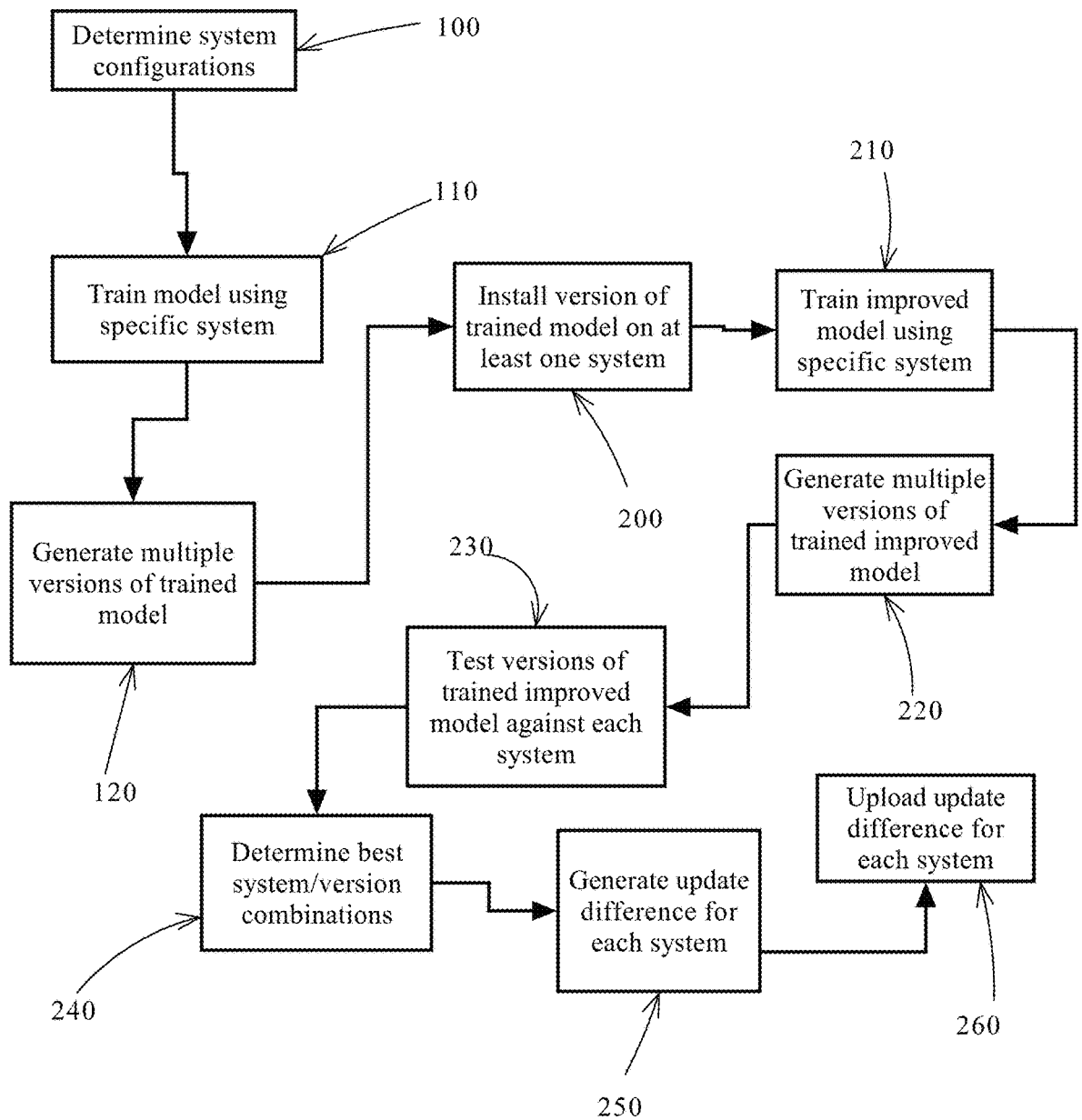
FIG. 3 is a flowchart detailing the steps in a method according to another aspect of the present invention.

Referring to FIG. 3, a flowchart detailing the steps in another aspect of the present invention is illustrated. As noted above, this aspect relates to updating versions of a trained model that have been installed on various data processing systems. As with the first aspect, the various data processing systems all have differing configurations, resources, and capabilities. Note that steps 100-120 are the same as in FIG. 1. In step 200, one of the versions of the trained model is installed on one or more of the data processing systems. Once an improved machine learning model (similar to the initial machine learning model) has been generated, this improved machine learning model is then trained on the same system as the initial model (step 210). As noted above, this improved model is preferably very similar or close to the original trained model in terms of weight matrices, coefficients, and the like. Once trained, the resulting improved trained model is then used as the basis for stripped down versions to be used on the various data processing systems. These stripped down versions are generated (step 220) using the above noted methods and concepts. The stripped down versions of the improved trained model are then assessed against each of the data processing systems (step 230) to determine which stripped down version works best with which data processing system (step 240).

Once the optimal system/version combination has been worked out for each of the systems, a differential compression technique can be used to find the update difference for each system. This involves, for each data processing system, finding the difference between a selected stripped down version of the updated model (i.e. the stripped down version that is most suited for the data processing system) and the installed version on the data processing system. The difference (i.e. the update difference) is calculated (step 250) and then uploaded to the data processing system (step 260).

The embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g. "C") or an object-oriented language (e.g. "C++", "java", "PHP", "PYTHON" or "C#") or in any other suitable programming language (e.g. "Go", "Dart", "Ada", "Bash", etc.). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

What is claimed is:

1. A method for determining which hardware platform to use when implementing a machine learning model, the method comprising:
    a) determining configurations of multiple hardware platforms, each of said multiple hardware platforms having different hardware configurations from each other;
    b) selecting a specific selected hardware platform from said multiple hardware platforms;
    c) training a specific machine learning model on said selected hardware platform to result in a first trained model;
    d) adjusting said first trained model to operate on another of said multiple hardware platforms to result in at least one second trained model;
    e) determine performance data of said at least one second trained model to determine efficacy and latency data for said at least one second trained model;
    f) repeating steps d) and e) for each of said multiple hardware platforms to result in multiple second trained models and in a trade-off data set comprising efficacy and latency data for each of said multiple hardware platforms;
    g) determining an optimal hardware platform to use when operating said machine learning model based on said trade-off data.

2. The method according to claim 1, wherein said specific selected hardware platform has a most amount of resources available when compared to said multiple hardware platforms.

3. The method according to claim 1, wherein said model comprises at least one neural network.

4. The method according to claim 3, wherein step d) comprises removing at least one hidden layer from said at least one neural network.

5. The method according to claim 3, wherein step d) comprises adjusting values in weight matrices used by said at least one neural network.

6. The method according to claim 5, wherein said values in weight matrices are adjusted by reducing a level of precision of said values.

7. The method according to claim 1, wherein said multiple hardware platforms includes at least one of:
    a cloud based server;
    a desktop based server;
    a portable computing device based data processing system; and
    a handheld portable computing device based data processing system.

8. The method according to claim 1, wherein each of said at least one second trained model is adjusted specifically to operate on one of said multiple hardware platforms.

9. A method for determining updates for multiple versions of a machine learning model on different hardware platforms, the method comprising:
    a) determining configuration of multiple hardware platforms, each of said multiple hardware platforms having different hardware configurations from each other;
    b) selecting a specific selected hardware platform from said multiple hardware platforms;
    c) training a specific machine learning model on said selected hardware platform to result in a first trained model;
    d) adjusting said first trained model to operate on another of said multiple hardware platforms to result in at least one second trained model;
    e) repeating step d) for each of said multiple hardware platforms to result in multiple second trained models;
    f) training an improved version of said specific machine learning model on said selected hardware platform to result in an improved first trained model, said first trained model and said improved first trained model having parameters that are as similar as possible to each other;
    g) adjusting said improved first trained model to operate on another of said multiple hardware platforms to result in at least one improved second trained model, said improved second trained model having parameters that are as similar as possible to said at least one second trained model;
    h) repeating step g) for each of said multiple hardware platforms to result in multiple improved second trained models;
    i) for each of said multiple hardware platforms, determining an update difference;
    j) uploading a specific update difference for each of said multiple hardware platforms;

wherein
said update difference is a difference between said second trained model for a specific hardware platform and said improved second trained model for said specific hardware platform;
steps f) to j) are executed only after one second trained model is installed on at least one of said data processing systems.

10. The method according to claim 9, further including a step of transmitting a specific update difference to one specific hardware platform, said specific update difference being an update difference calculated specifically for said one specific hardware platform using said second trained model and said improved second trained model for said one specific hardware platform.

11. The method according to claim 9, wherein each of said second trained models is adjusted specifically to operate on a specific one of said multiple hardware platforms.

12. The method according to claim 9, wherein each of said improved second trained models is adjusted specifically to operate on a specific one of said multiple hardware platforms.

13. The method according to claim 9, wherein said multiple hardware platforms includes at least one of:

a cloud based server;
a desktop based server;
a portable computing device based data processing system; and
a handheld portable computing device based data processing system.

14. The method according to claim 9, wherein said specific selected hardware platform has a most amount of resources available when compared to said multiple hardware platforms.

15. The method according to claim 9, wherein said machine learning model comprises at least one neural network.

16. The method according to claim 15, wherein step g) comprises removing at least one hidden layer from said at least one neural network.

17. The method according to claim 15, wherein step g) comprises adjusting values in weight matrices used by said at least one neural network.

18. The method according to claim 17, wherein said values in weight matrices are adjusted by reducing a level of precision of said values.

* * * * *